(12) United States Patent
Harrison et al.

(10) Patent No.: US 10,173,650 B1
(45) Date of Patent: Jan. 8, 2019

(54) PEDAL WITH SNAP-FIT PIVOT BUSHING

(71) Applicant: Dura Operating, LLC, Auburn Hills, MI (US)

(72) Inventors: John William Harrison, Goodrich, MI (US); Brian Edward Steakley, Chesterfield, MI (US)

(73) Assignee: DURA OPERATING, LLC, Auburn Hills, MI (US)

( * ) Notice: Subject to any disclaimer, the term of this patent is extended or adjusted under 35 U.S.C. 154(b) by 0 days.

(21) Appl. No.: 15/825,687

(22) Filed: Nov. 29, 2017

(51) Int. Cl.
*G05G 1/30* (2008.04)
*B60T 7/04* (2006.01)
*F16C 11/04* (2006.01)
*B60T 7/06* (2006.01)

(52) U.S. Cl.
CPC .............. *B60T 7/06* (2013.01); *F16C 11/045* (2013.01); *G05G 1/30* (2013.01)

(58) Field of Classification Search
CPC .... B60T 7/04; B60T 7/06; G05G 1/30; G05G 1/44; G05G 1/445; F16C 11/045
See application file for complete search history.

(56) References Cited

U.S. PATENT DOCUMENTS

| | | | | |
|---|---|---|---|---|
| 4,130,027 A | * | 12/1978 | Leighton | ............... B60T 7/06 267/153 |
| 6,609,438 B1 | * | 8/2003 | Bigham | ............... G05G 1/30 74/512 |
| 9,645,600 B2 | * | 5/2017 | Willemsen | ............... G05G 1/44 |
| 2009/0071285 A1 | * | 3/2009 | Lauderbaugh | ........... G05G 1/30 74/512 |

FOREIGN PATENT DOCUMENTS

| | | | | |
|---|---|---|---|---|
| DE | 4112132 A1 | * | 10/1991 | ............... B60T 7/06 |
| DE | 10336799 A1 | * | 3/2005 | ............... G05G 1/30 |
| EP | 1233321 A2 | * | 8/2002 | ............. B60K 26/02 |
| WO | WO-2016209154 A1 | * | 12/2016 | ............... B60T 7/06 |

OTHER PUBLICATIONS

Machine translation of DE 4112132 A obtained on May 16, 2018. (Year: 2018).*

* cited by examiner

*Primary Examiner* — Adam D Rogers
(74) *Attorney, Agent, or Firm* — Robert E. Ford; Raymond J. Vivacqua; Steven L. Crane

(57) ABSTRACT

A pedal with snap-fit bushing includes a pedal arm having a tubular sleeve oriented perpendicular and fixed to the pedal arm. A mounting pin is rotatably received within a tubular sleeve annular bore and extends partially beyond tubular sleeve opposed ends. A first pivot bushing is rotatably mounted to a first end of the mounting pin extending outward of the tubular sleeve. A second pivot bushing is rotatably mounted to a second end of the mounting pin extending outward of the tubular sleeve. A pedal housing includes a first wall having a first "L" shaped slot and a second wall having a second "L" shaped slot. The pivot bushings are received in a retention portion of the first and second slots to releasably retain the mounting pin and allow rotation of the pedal arm and the tubular sleeve about a rotational axis of the mounting pin.

20 Claims, 9 Drawing Sheets

PEDAL WITH SNAP-FIT PIVOT BUSHING

FIELD

The present disclosure relates generally to brake and clutch pedal assemblies for automobile vehicles.

BACKGROUND

The statements in this section merely provide background information related to the present disclosure and may or may not constitute prior art.

Known pedal assemblies for automobile vehicle throttle, brake and clutch pedals are assembled from first and second pedal halves, which are fastened to each other using multiple fasteners. The assembly is then rotatably mounted to a pedal housing using a pin that must be extended through a portion of the pedal housing, through the pedal assembly, and then through a second portion of the pedal housing, thereby making the assembly time consuming and difficult to align.

Thus, while current automobile vehicle pedal designs achieve their intended purpose, there is a need for a new and improved system and method for constructing and installing throttle, brake and clutch pedal assemblies for automobile vehicles.

SUMMARY

According to several aspects, a pedal with snap-fit bushing includes a pedal arm. A mounting pin is rotatably received in the pedal arm. A first pivot bushing is rotatably mounted to a first end of the mounting pin, and a second pivot bushing rotatably mounted to a second end of the mounting pin. A pedal housing includes a first wall having a first slot and a second wall having a second slot. The first pivot bushing is received in the first slot and the second pivot bushing is received in the second slot to releasably retain the mounting pin allowing rotation of the pedal arm about a rotational axis of the mounting pin.

In another aspect of the present disclosure, the first slot created in the first wall and the second slot created in the second wall of the pedal housing each define a substantially "L" shaped slot having an entrance portion and retention portion.

In another aspect of the present disclosure, the first pivot bushing is identical to the second pivot bushing, and each include opposed elastically deflectable first and second arms. The elastically deflectable first and second arms of the first pivot bushing deflect toward each other when the first pivot bushing enters the retention portion of the first slot and the elastically deflectable first and second arms of the second pivot bushing deflect toward each other when the second pivot bushing enters the retention portion of the second slot.

In another aspect of the present disclosure, the retention portion of each of the first slot created in the first wall and the second slot created in the second wall include a lower wall and an opposed upper wall, the lower wall including a first elongated opening and the upper wall including a second elongated opening.

In another aspect of the present disclosure, as each of the first pivot bushing and the second pivot bushing approach an end of the retention portion, the first deflection arm elastically springs outwardly to be partially received within the first elongated opening created in the lower wall and the second deflection arm elastically springs outwardly to be partially received within the second elongated opening created in the upper wall.

In another aspect of the present disclosure, the first deflection arm upon entering the first elongated opening contacts an edge defined by the first elongated opening and the second deflection arm upon entering the second elongated opening contacts an edge defined by the second elongated opening to releasably lock each of the first pivot bushing and the second pivot bushing within the retention portion.

In another aspect of the present disclosure, a maximum spacing between the first arm and the second arm in as as-molded, non-deflected condition is greater than or equal to a gap between the lower wall and the upper wall of the retention portion.

In another aspect of the present disclosure, the mounting pin includes a first shoulder at a first end and a second shoulder at a second end, having the first pivot bushing mounted to the first shoulder and the second pivot bushing mounted to the second shoulder.

In another aspect of the present disclosure, a tubular sleeve is fixed to the pedal arm. The mounting pin is rotatably received within an annular bore of the tubular sleeve and extends partially beyond opposed first and second ends of the tubular sleeve. The first pivot bushing extends outward of the first end of tubular sleeve and the second pivot bushing extends outward of the second end of the tubular sleeve.

In another aspect of the present disclosure, the tubular sleeve is substantially bisected by the pedal arm and is fixed by welding to the pedal arm.

According to several aspects, a pedal with snap-fit bushing includes a pedal arm having a tubular sleeve oriented perpendicular to the pedal arm and fixed to the pedal arm. A mounting pin is rotatably received within an annular bore of the tubular sleeve and extends partially beyond opposed ends of the tubular sleeve. A first pivot bushing rotatably mounted to a first end of the mounting pin extends outward of the tubular sleeve. A second pivot bushing rotatably mounted to a second end of the mounting pin extends outward of the tubular sleeve. A pedal housing includes a first wall having a first "L" shaped slot and a second wall having a second "L" shaped slot. The first pivot bushing is received in a retention portion of the first slot and the second pivot bushing is received in a retention portion of the second slot to releasably retain the mounting pin allowing rotation of the pedal arm and the tubular sleeve about a rotational axis of the mounting pin.

In another aspect of the present disclosure, the first pivot bushing includes opposed elastically deflecting first and second arms, and the second pivot bushing includes opposed elastically deflecting first and second arms.

In another aspect of the present disclosure, the first "L" shaped slot and the second "L" shaped slot each include an entrance portion leading into the retention portion, and the retention portion of each of the first slot created in the first wall and the second slot created in the second wall include a lower wall and an opposed upper wall. The lower wall includes a first elongated opening and the upper wall includes a second elongated opening.

In another aspect of the present disclosure, a maximum spacing between the first deflection arm and the second deflection arm in as as-molded, non-deflected condition is greater than or equal to a gap between the lower wall and the upper wall of the retention portion such that as the first pivot bushing and the second pivot bushing each enter one of the retention portions of either the slot of the first wall or the slot of the second wall, the first deflection arm and the second deflection arm elastically deflect toward each other creating a stored elastic biasing force.

In another aspect of the present disclosure, each of the deflection arms further includes a flat stop face. The deflection arms extend due to the stored elastic biasing force into one of the first or the second elongated openings and the flat stop face seats against an edge of the elongated openings.

In another aspect of the present disclosure, the mounting pin when received in the annular bore of the tubular sleeve, the first pivot bushing rotatably mounted to the first end of the mounting pin, and the second pivot bushing rotatably mounted to the second end of the mounting pin together define a pedal assembly. The pedal assembly is installed in the pedal housing in an initial installation direction with the first pivot bushing being slidably received in the entrance portion of the first "L" shaped slot and the second pivot bushing being slidably received in the entrance portion of the second "L" shaped slot.

In another aspect of the present disclosure, in a final installation direction of the pedal assembly different from the initial installation direction, the first pivot bushing is slidably displaced into the retention portion of the first "L" shaped slot and the second pivot bushing is slidably displaced into the retention portion of the second "L" shaped slot with the first deflection arm of each of the first pivot bushing and the second pivot bushing sliding along the lower wall of each retention portion and the second deflection arm of each of the first pivot bushing and the second pivot bushing sliding along each upper wall of the retention portion.

According to several aspects, a pedal with snap-fit bushing includes a pedal assembly having: a pedal arm having a tubular sleeve oriented perpendicular to the pedal arm and fixed to the pedal arm; a mounting pin rotatably received within an annular bore of the tubular sleeve and extending partially beyond opposed ends of the tubular sleeve; a first pivot bushing rotatably mounted to a first end of the mounting pin extending outward of the tubular sleeve, the first pivot bushing having elastically deflecting first and second arms; and a second pivot bushing rotatably mounted to a second end of the mounting pin extending outward of the tubular sleeve, the second pivot bushing having elastically deflecting first and second arms. A pedal housing includes a first wall having a first "L" shaped slot and a second wall having a second "L" shaped slot. The first pivot bushing is received in an entrance portion of the first slot and has the first and second arms of the first pivot bushing releasably retained in a retention portion of the first slot. The second pivot bushing is received in an entrance portion of the second slot and has the first and second arms of the second pivot bushing releasably retained in a retention portion of the second slot thereby preventing rotation of the first pivot bushing and the second pivot bushing while allowing rotation of the pedal arm and the tubular sleeve about a rotational axis of the mounting pin.

In another aspect of the present disclosure, during assembly of the pedal assembly into the pedal housing the first pivot bushing is received in the entrance portion of the first slot in a first direction and is moved into the retention portion in a second direction; and the second pivot bushing is received in the entrance portion of the second slot in the first direction and is moved into the retention portion in the second direction.

In another aspect of the present disclosure, during installation of the pedal assembly into the pedal housing the first deflection arm enters a first elongated opening created in the retention portion of the pedal housing and contacts an edge defined by the first elongated opening, and the second deflection arm enters a second elongated opening created in the retention portion of the pedal housing and contacts an edge defined by the second elongated opening to releasably lock each of the first pivot bushing and the second pivot bushing within the retention portion.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
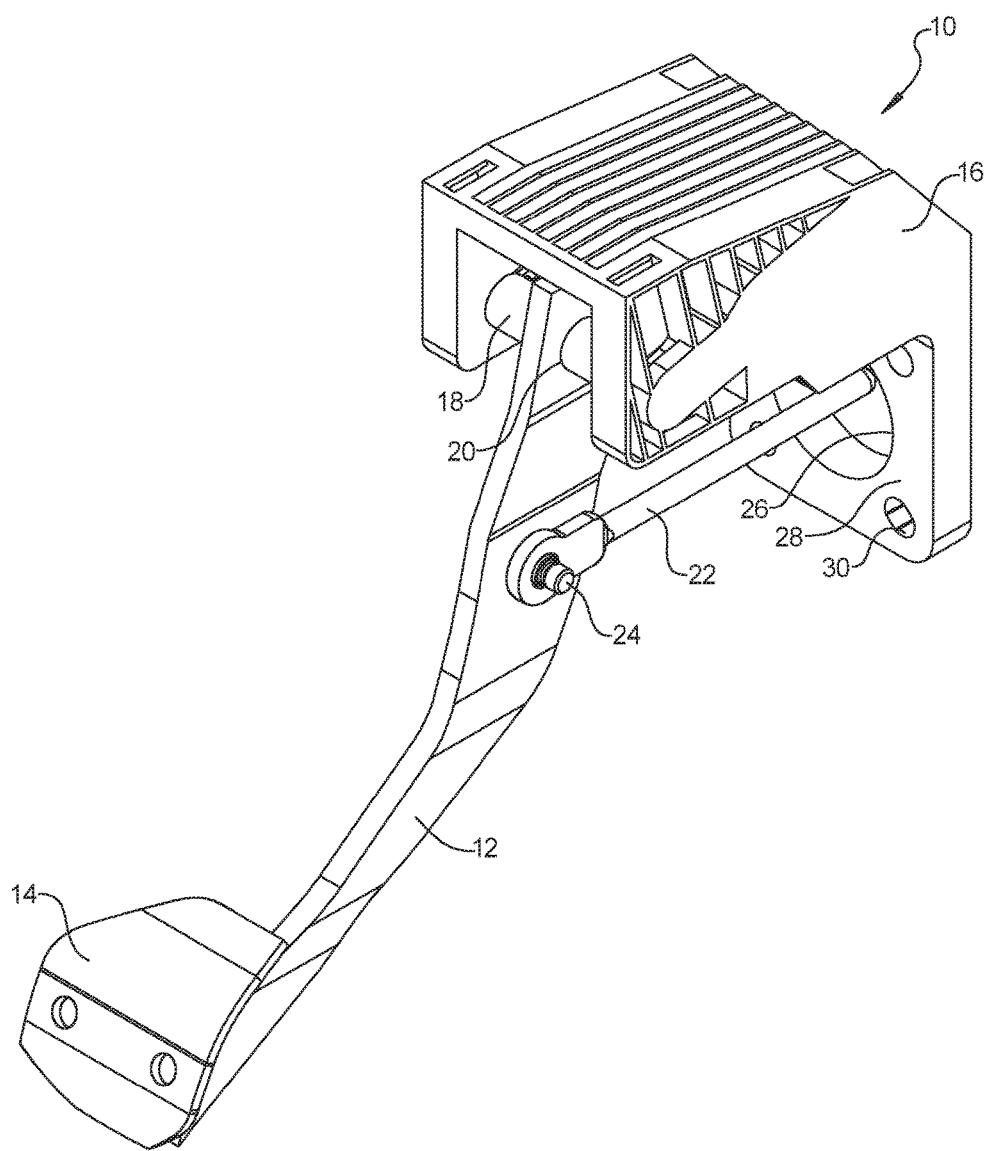
FIG. 1 is a front left perspective view of a pedal assembly with snap-fit bushing according to an exemplary embodiment.

Referring to FIG. 1, a pedal with snap-fit bushing 10 defines an assembly having a pedal arm 12 of a material such as steel or aluminum having a pedal face 14 fixed at a first end of the pedal arm 12. The pedal arm 12 is rotatably connected to a pedal housing 16. The pedal housing 16 is made for example of a polymeric material which can be injection molded to a desired geometry. A tubular sleeve 18 is fixed to and is substantially bisected by the pedal arm 12 for example by a weld joint 20. An engagement rod 22 is rotatably connected to a pin 24 fixed to the pedal arm 12. The engagement rod 22 extends through a clearance aperture 26 created through a mounting flange 28 of the pedal housing 16 to actuate a device such as a brake assembly or a clutch assembly (not shown). The mounting flange 28 can include multiple apertures 30 which receive fasteners (not shown) used to mount the pedal housing 16 to structure of a motor vehicle such as a firewall or to a structure supported by the firewall (not shown).

Figure 7:
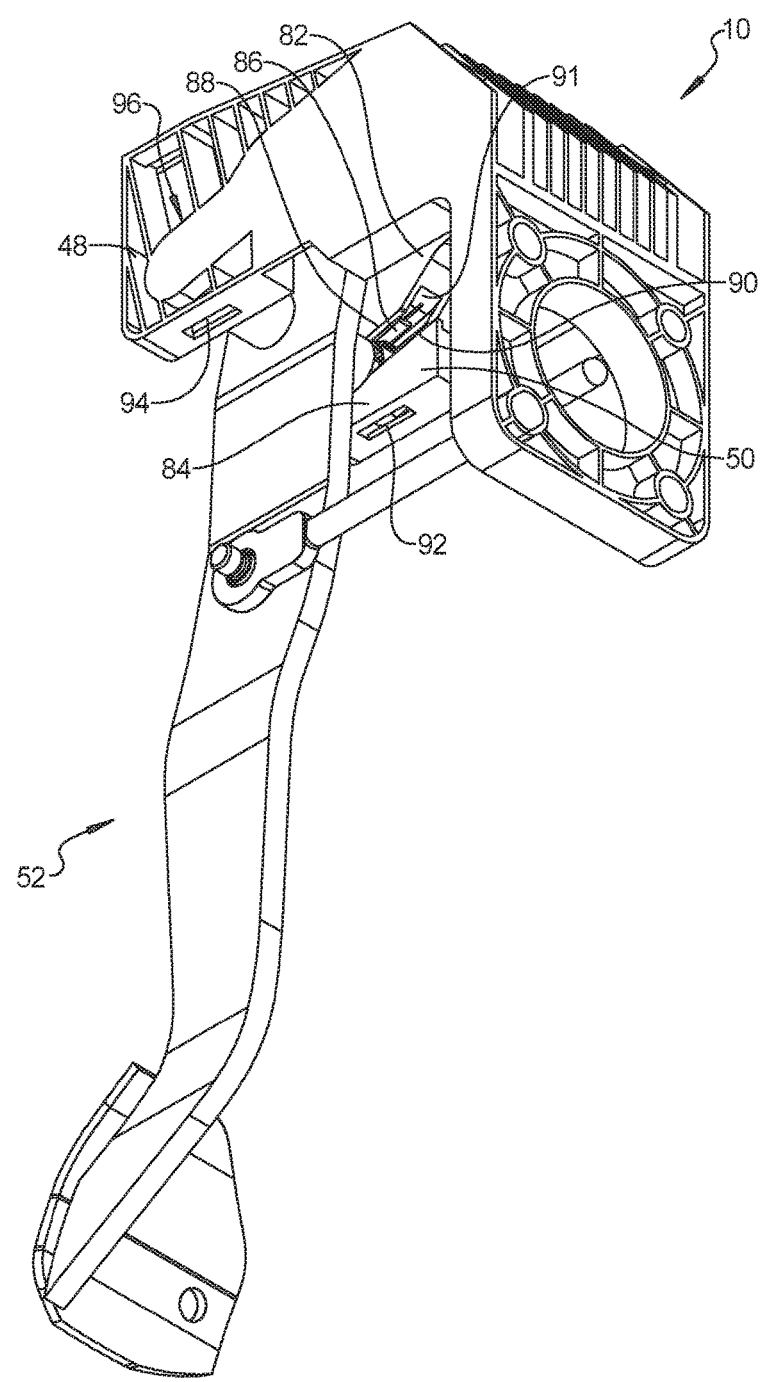
FIG. 7 is a rear left perspective assembly view of the pedal assembly of FIG. 1.

Referring to FIG. 2 and again to FIG. 1, the tubular sleeve 18 is fixed to a substantially flat mounting end 32 of the pedal arm 12. The tubular sleeve 18 extends through an aperture 34 created in the mounting end 32 and is fixed for example by a friction fit in the aperture 34, or may also be fixed for example by the welding joint 20 to the mounting end 32 as previously described. The tubular sleeve 18 is hollow and provides an annular bore 36 throughout a length of the tubular sleeve 18. A mounting pin 38 is rotatably received within the annular bore 36 and extends partially beyond opposed ends of the tubular sleeve 18. A first pivot bushing 40 described in greater detail in reference to FIG. 7 is rotatably mounted onto a first shoulder 42 created on a first end of the mounting pin 38. When installed, the mounting pin 38 can freely rotate with respect to the first pivot bushing 40.

Figure 3:
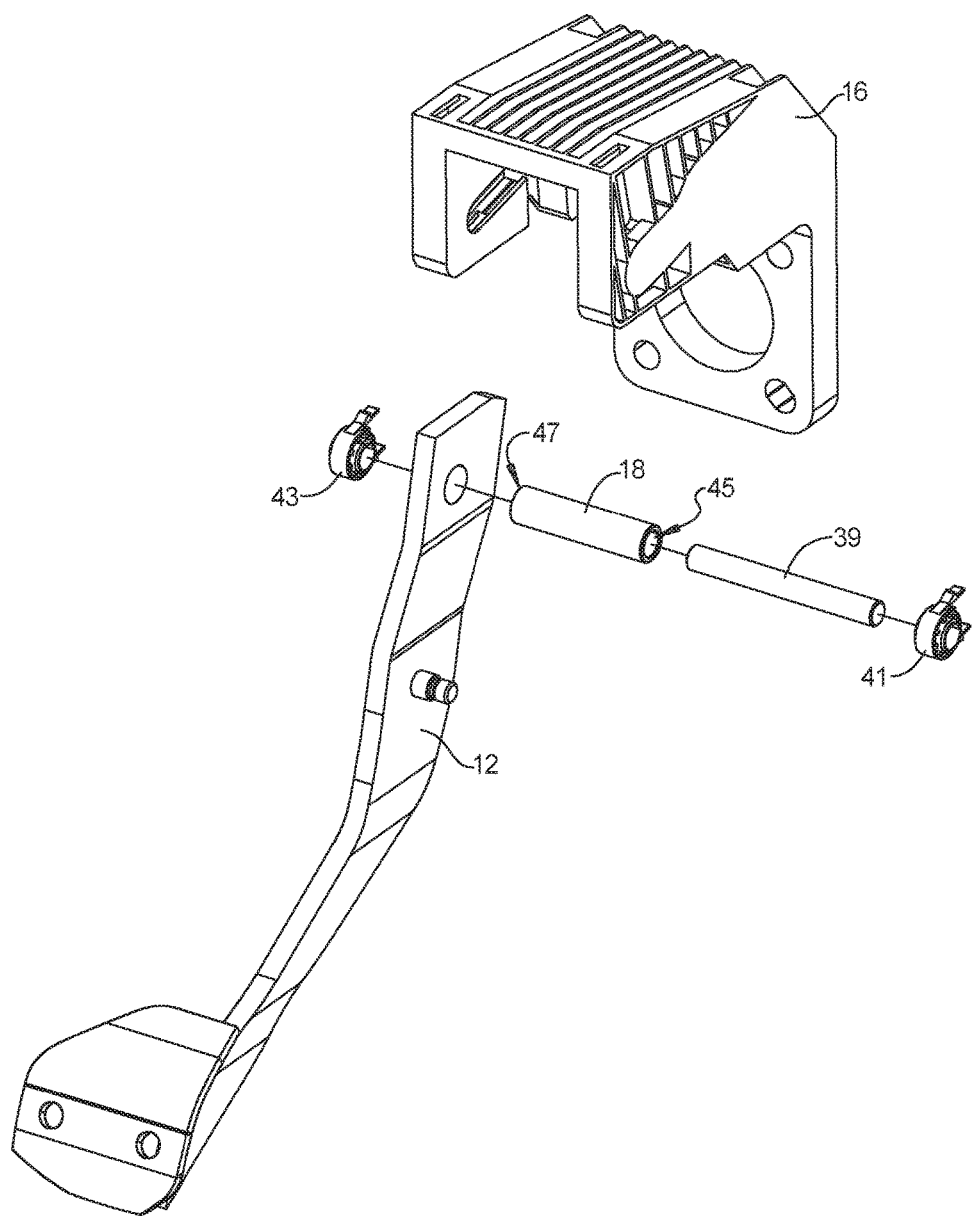
FIG. 3 is a perspective assembly view of a pedal assembly modified from the pedal assembly of FIG. 2.

With the mounting pin 38 received in the annular bore 36 of the tubular sleeve 18, a second pivot bushing 44 is rotatably mounted onto a second shoulder 46 of the mounting pin 38 similar to the first pivot bushing 40. According to several aspects, the first shoulder 42 and the second shoulder 46 have a diameter smaller than a diameter of the main body of the mounting pin 38. The first pivot bushing 40 is then releasably coupled to a first wall 48 of the pedal housing 16 and the second pivot bushing 44 is releasably coupled to a second wall 50 of the pedal housing 16 which is described in greater detail in reference to FIGS. 3 through 5.

Figure 2:
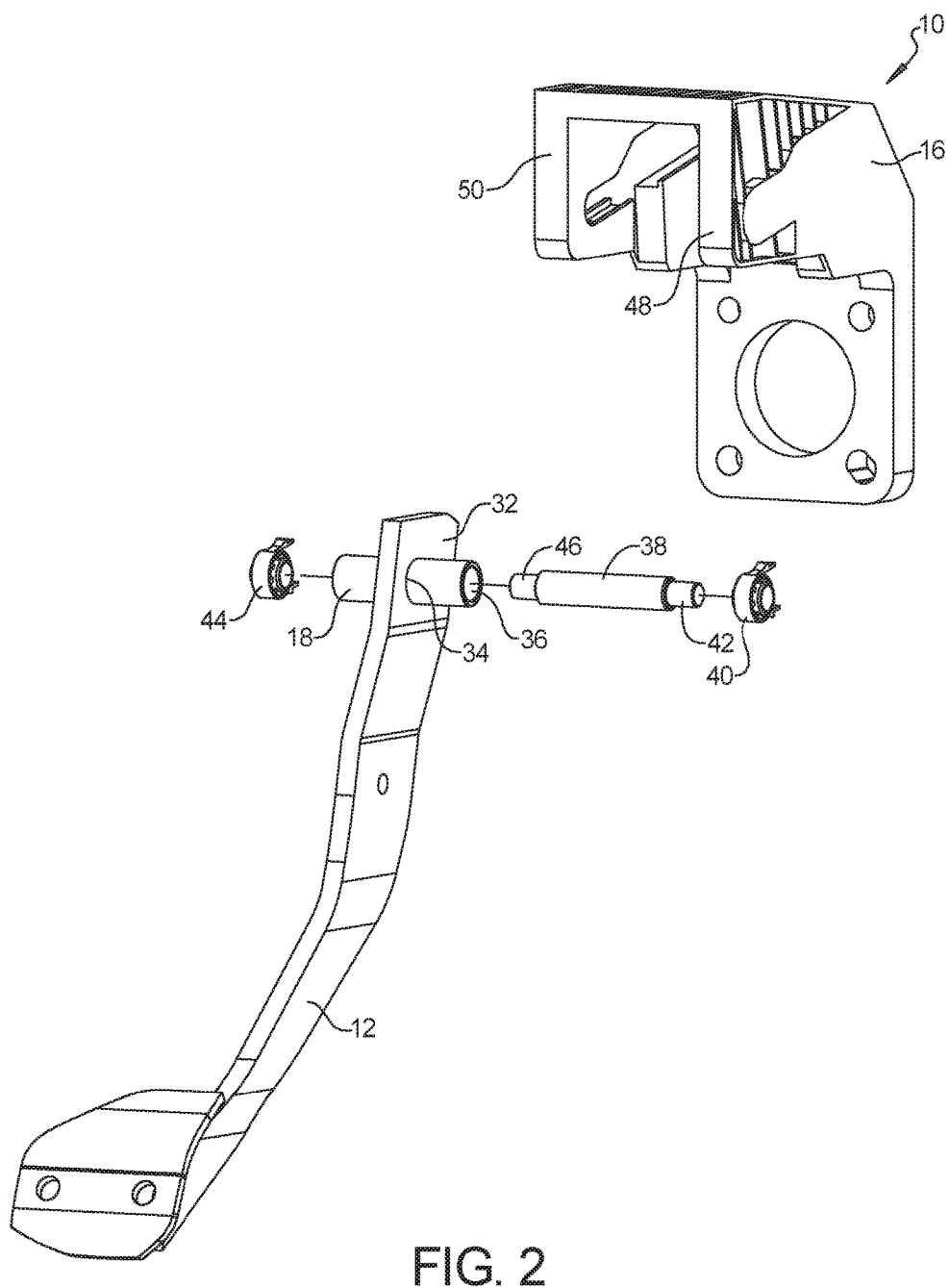
FIG. 2 is a perspective assembly view of the pedal assembly of FIG. 1.

Referring to FIG. 3 and again to FIGS. 1 and 2, according to further aspects, a mounting pin 39 is modified from the mounting pin 38 to provide a universal diameter throughout an entire length of the mounting pin 39, thereby eliminating the first shoulder 42 and the second shoulder 46 of the mounting pin 38. A first pivot bushing 41 and a second pivot bushing 43 are modified to slidably receive the diameter of the mounting pin 39. In the alternative, the tubular sleeve 18 can be modified to decrease the diameter of the bore 36 to accommodate a smaller diameter of the mounting pin 39, and the first pivot bushing 40 and the second pivot bushing 44 can continue to be used. Because the tubular sleeve 18 has a greater diameter than the mounting pin 39, the first pivot bushing 41 and the second pivot bushing 43 when installed on the mounting pin 39 remain spaced apart from each other by contacting opposed end faces 45, 47 of the tubular sleeve 18.

Referring to FIG. 4 and again to FIGS. 1 and 2, a pedal assembly 52 includes the pedal arm 12, the tubular sleeve 18, the mounting pin 38, and each of the first pivot bushing 40 and the second pivot bushing 44. The pedal assembly 52 is shown prior to installation into the pedal housing 16. Each of the first wall 48 and the second wall 50 of the pedal housing 16 includes a substantially "L" shaped slot, with only a slot 54 of the second wall 50 clearly visible in this view. The "L" shaped slots are substantially mirror images of each other, therefore the following discussion of the slot 54 of the second wall 50 applies equally to the slot created in the first wall 48. The slot 54 includes a first or entrance portion 58 and a second or retention portion 60 which is angularly oriented with respect to the entrance portion 58. The entrance portion 58 is dimensioned to slidably receive the second pivot bushing 44. The second pivot bushing 44 (as well as the first pivot bushing) includes each of an elastically deflecting first deflection arm 62 and an opposed elastically deflecting second deflection arm 64 both of which extend freely from each of the first pivot bushing 40 and the second pivot bushing 44, which are described in greater detail in reference to FIG. 7.

The pedal assembly 52 is moved in an initial installation direction 66 with the second pivot bushing 44 being slidably received in the entrance portion 58 of the slot 54. When the second pivot bushing 44 contacts an end of the entrance portion 58 a direction of installation of the pedal assembly 52 is changed to a final installation direction 68. In the final installation direction 68 of the pedal assembly 52, the second pivot bushing 44 is displaced into the retention portion 60 of the slot 54 with the first deflection arm 62 sliding along a lower wall 70 of the retention portion 60 and the second deflection arm 64 sliding along an upper wall 72 of the retention portion 60. The lower wall 70 is oriented substantially parallel to the upper wall 72 and the retention portion 60 is narrower than the entrance portion 58 such that the first deflection arm 62 and the second deflection arm 64 elastically deflect toward each other during displacement of the second pivot bushing 44 within the retention portion 60.

As the second pivot bushing 44 nears an end of the retention portion 60, the first deflection arm 62 elastically springs outwardly (downwardly as viewed in FIG. 3) to be partially received within a first elongated opening 74 created in the lower wall 70. At the same time the second deflection arm 64 elastically springs outwardly (upwardly as viewed in FIG. 3) to be partially received within a second elongated opening 76 created in the upper wall 72. It is noted only the second elongated opening 76 of the first wall 48 of the pedal housing 16 is clearly visible in this view. The springing action of the first deflection arm 62 upon entering the first elongated opening 74 creates contact between a portion of the first deflection arm 62 and an edge 77 defined by the first elongated opening 74. Similarly, the springing action of the second deflection arm 64 upon entering the second elongated opening 76 creates contact between a portion of the second deflection arm 64 and an edge 79 defined by the second elongated opening 76. This contact releasably locks the second pivot bushing 44 within the retention portion 60.

Referring to FIG. 5 and again to FIGS. 1 through 4, the second pivot bushing 44 is shown during initial installation into the entrance portion 58 of the slot 54. As previously noted the pedal assembly 52 is displaced in the initial installation direction 66. The first deflection arm 62 and the second deflection arm 64 (only the second deflection arm 64 is clearly visible in this view) do not deflect during installation into the entrance portion 58.

Figure 4:
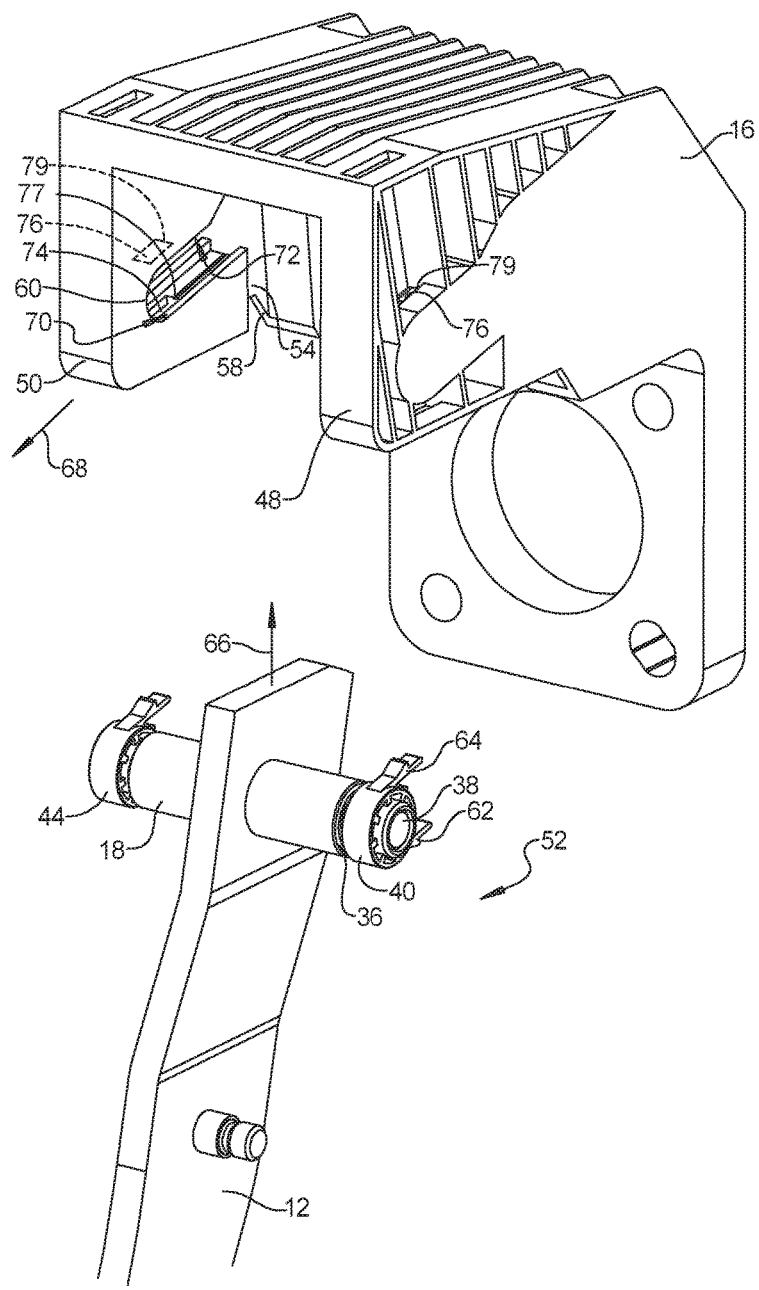
FIG. 4 is a front left perspective view of the partially assembled pedal assembly with snap-fit bushing of FIG. 2.
Figure 5:
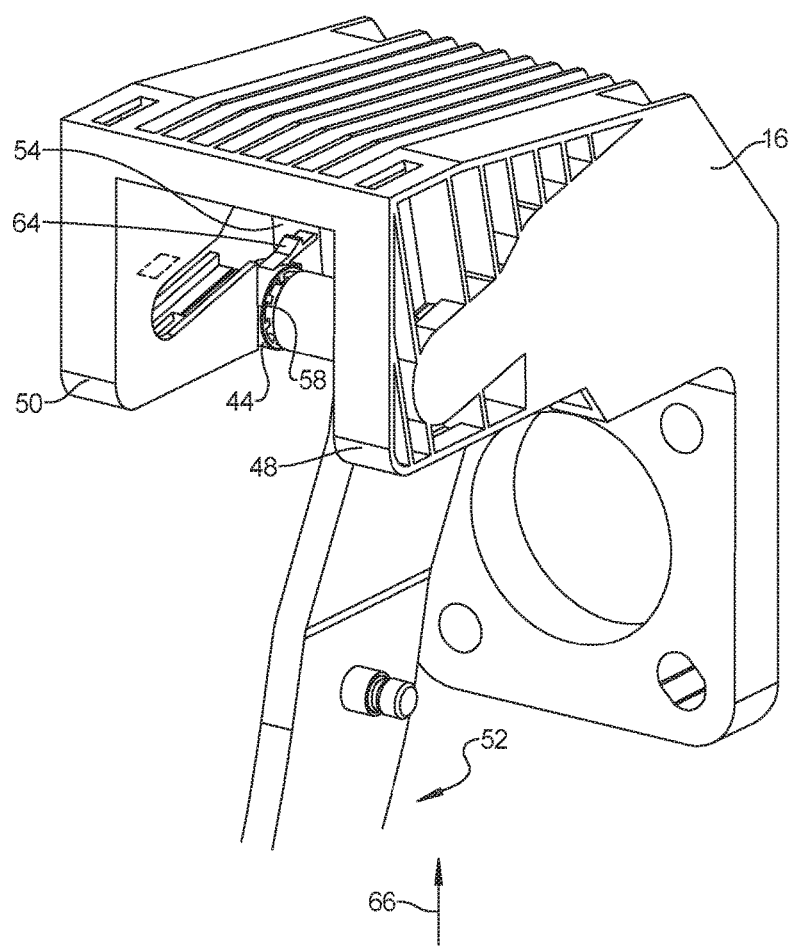
FIG. 5 is a front left perspective view of the pedal assembly with snap-fit bushing of FIG. 4 during initial assembly.
Figure 6:
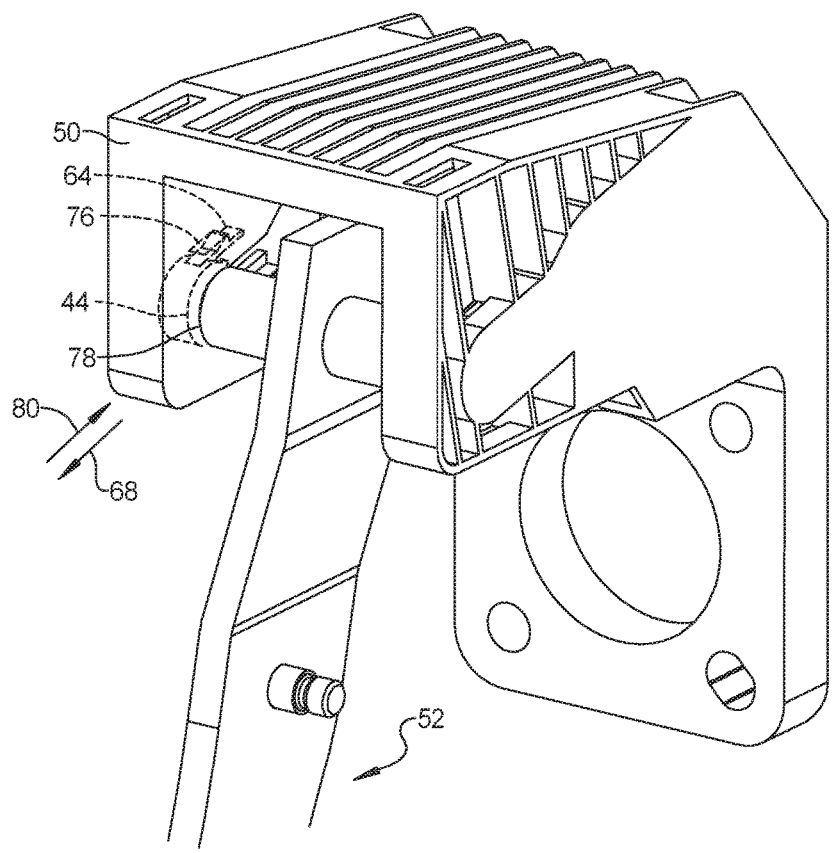
FIG. 6 is a front left perspective view of the pedal assembly with snap-fit bushing of FIG. 5 after final assembly.

Referring to FIG. 6 and again to FIGS. 4 through 5, in the installed position of the pedal assembly 52 the second pivot bushing 44 contacts an end wall 78 of the retention portion 60 preventing further displacement of the pedal assembly 52 in the final installation direction 68. When the first deflection arm 62 partially enters the first elongated opening 74 created in the lower wall 70, and when the second deflection arm 64 partially enters the second elongated opening 76 in the upper wall 72, the pedal assembly 52 is prevented from displacing in a release direction 80, opposite to the final installation direction 68.

Referring to FIG. 7 and again to FIGS. 1 through 6, each of the first wall 48 and the second wall 50 of the pedal housing 16 provide a first wall portion 82 and a second wall portion 84. Each wall portion provides a slot such as a slot 86 to slidably guide the first deflection arm 62 and the second deflection arm 64 of each of the first pivot bushing 40 and the second pivot bushing 44. Each slot such as the slot 86 includes a first slot wall 88 and an opposed second slot wall 90. A tapered ramp 91 can also be provided defining an entrance into the slot 86 to enhance entry of the deflection arms.

In the event that removal of the pedal assembly 52 from its installed position within the pedal housing 16 is desired, access slots are provided for a tool such as a slotted screwdriver to enter and to displace the first deflection arm 62 and the second deflection arm 64 from their engaged positions. Examples of these slots include a first access slot 92 and a second access slot 94. After release of the deflection arms, a removal path of the pedal assembly 52 is opposite to the installation sequence described in reference to FIGS. 3 through 5.

It is further noted that side walls of the first wall 48 and the second wall 50 of the pedal housing 16 each include a solid surface 96 defining end surfaces of the slot 54 of both the first wall 48 and the second wall 50. The solid surfaces 96 of the first wall 48 and the second wall 50 define positive constraints to limit side-to-side displacement of the mounting pin 38 and therefore limit side-to-side displacement of the first pivot bushing 40 and the second pivot bushing 44.

Figure 8:
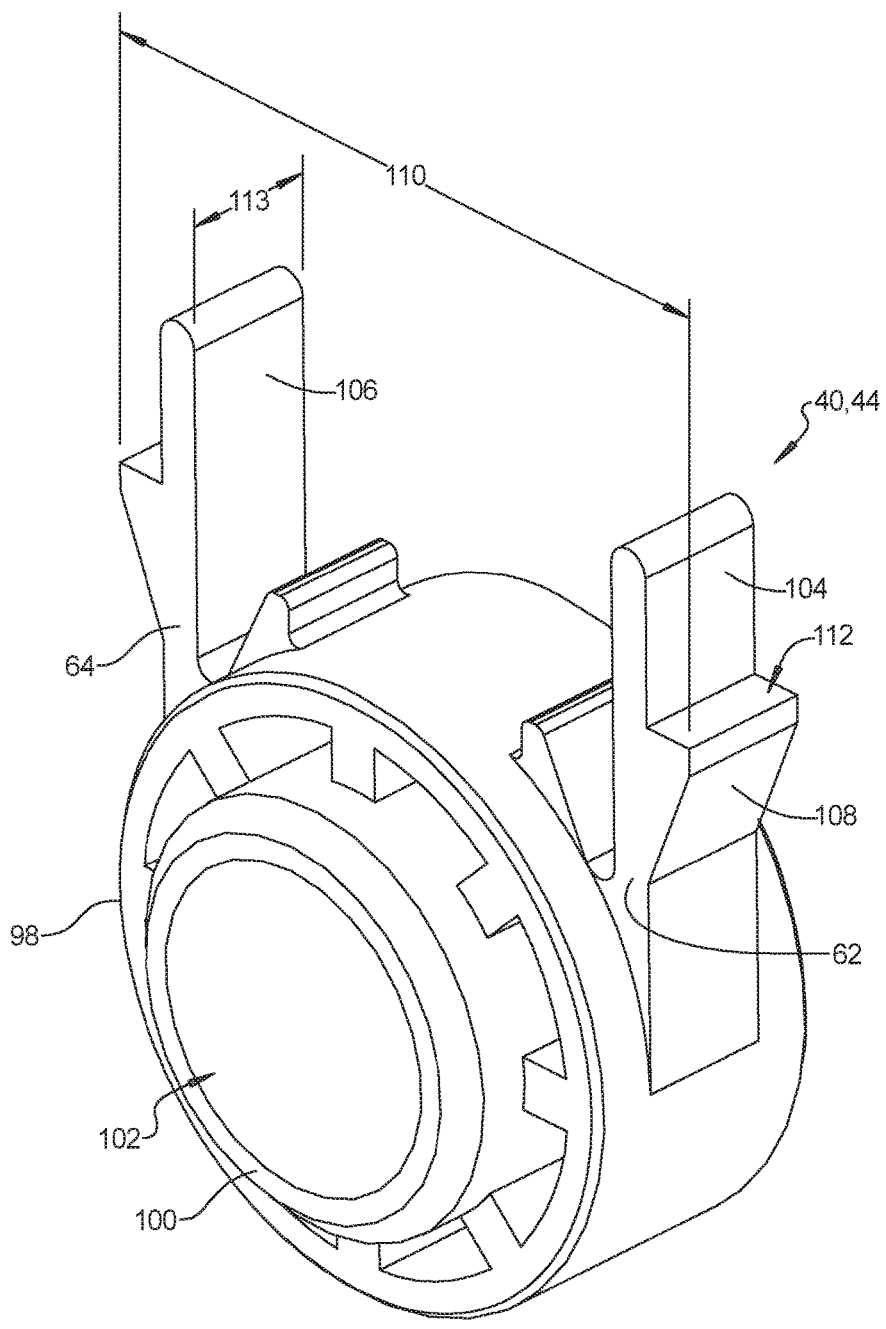
FIG. 8 is a front perspective view of a snap fitting of the present disclosure.

Referring to FIG. 8, each of the first pivot bushing 40 and the second pivot bushing 44 are identical bushings made for example from an injection molded polymeric material. Each includes a substantially cylindrical body 98 having a centrally aligned cylinder 100. A bore 102 slidably receives the mounting pin 38 described in reference to FIG. 2 and thereafter allows rotation of the mounting pin 38 within the bore 102. The first deflection arm 62 and the second deflection arm 64 are mirror images of each other, with a tab 104 extending from the first deflection arm 62, and a tab 106 extending from the second deflection arm 64.

A maximum spacing 110 between the first deflection arm 62 and the second deflection arm 64 in as as-molded, non-deflected condition is greater than or equal to a gap between the lower wall 70 and the upper wall 72 of the retention portion 60 (see FIG. 3) such that as the first pivot bushing 40 and the second pivot bushing 44 each enter one of the retention portions 60 of either the slot 54 of the first wall 48 or the slot 54 of the second wall 50, the first and second deflection arms elastically deflect toward each other creating a stored elastic biasing force. Each of the deflection arms also includes a tapered face 108 which aids the deflection arms to elastically deflect toward the body 98 when sliding through the retention portion 60 shown and described in reference to FIG. 3.

Each of the deflection arms further includes a flat stop face 112 oriented substantially perpendicular to the tabs 104, 106. After the deflection arms extend due to the stored biasing force into one of the elongated openings 74, 76 the flat stop face 112 seats against an edge of the elongated openings such as the edge 77 of the first elongated opening 74 to releasably capture the pedal assembly 52 in the installed position shown in FIG. 5. A width 113 of each of the first deflection arm 62 and the second deflection arm 64 is equal, permitting the deflection arms to slidably enter the slot 86 created in each wall portion described in reference to FIG. 6.

Referring to FIG. 9 and again to FIG. 7, a lower surface 114 of the pedal housing 16 is shown. The first access slot 92 created through the lower surface 114 provides access to the first deflection arm 62 of the first pivot bushing 40 and the second access slot 94 provides access to the first deflection arm 62' of the second pivot bushing 44. The first access slot 92 and the second access slot 94 can be sized to receive a blade end of a screwdriver or a similar tool.

Figure 10:
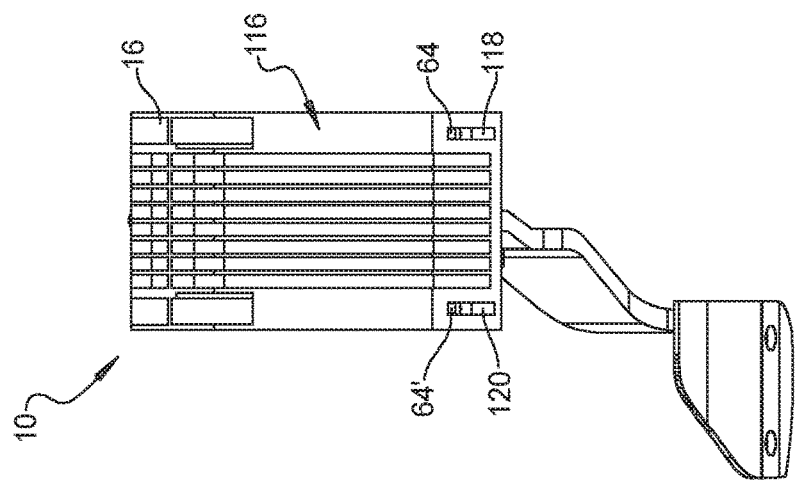
FIG. 10 is a top plan view of the pedal assembly of FIG. 1.
Figure 9:
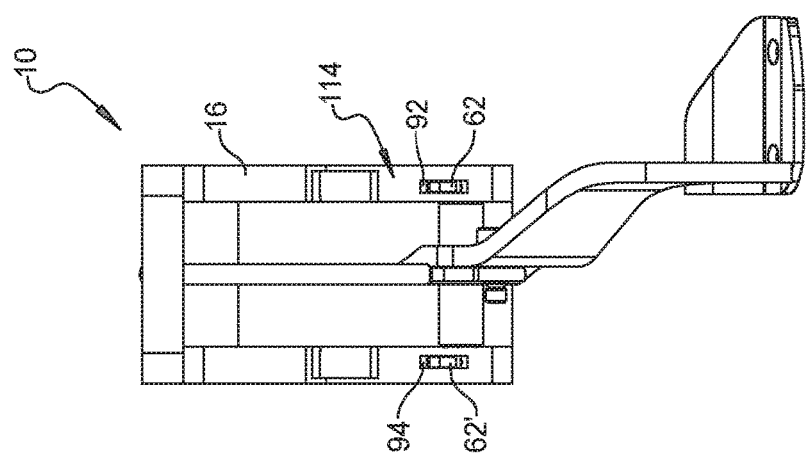
FIG. 9 is a bottom plan view of the pedal assembly of FIG. 1.

Referring to FIG. 10 and again to FIG. 9, an upper surface 116 of the pedal housing 16 is shown. A third access slot 118 provides access to the second deflection arm 64 of the first pivot bushing 40 and a fourth access slot 120 provides access to the second deflection arm 64' of the second pivot bushing 44.

A pedal with snap-fit bushing 10 of the present disclosure offers several advantages. These include a releasably installed pedal assembly 52 including a pedal arm 12, a tubular sleeve 18, a mounting pin 38, and each of a first pivot bushing 40 and a second pivot bushing 44. Provision of the pedal arm 12. The tubular sleeve 18 fixed to the pedal arm 12 provides a bore for rotationally receiving the mounting pin 38, with the first pivot bushing 40 and the second pivot bushing 44 mounted to opposite ends of the mounting pin 38. An "L" shaped slot created in a pedal housing 16 defines a path to both install and capture the mounting pin 38 and pivot bushings. The first pivot bushing 40 and the second pivot bushing 44 include elastically deflectable arms that are captured in slots of the pedal housing to releasably lock the pedal assembly 52 in a position allowing rotation of the pedal arm 12 without release of the pedal assembly 52.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A pedal with snap-fit bushing, comprising:
   a pedal arm;
   a mounting pin rotatably received in the pedal arm;
   a first pivot bushing rotatably mounted to a first end of the mounting pin, the first pivot bushing including an elastically deflectable first arm and an elastically deflectable second arm;
   a second pivot bushing rotatably mounted to a second end of the mounting pin; and
   a pedal housing including a first wall having a first slot and a second wall having a second slot, the first pivot bushing received in the first slot and the second pivot bushing received in the second slot to releasably retain the mounting pin allowing rotation of the pedal arm about a rotational axis of the mounting pin, wherein the elastically deflectable first and second arms deflect towards each other when the first pivot bushing moves along the first slot.

2. The pedal with snap-fit bushing of claim 1, wherein the first slot created in the first wall and the second slot created in the second wall of the pedal housing each have an entrance portion and a retention portion.

3. The pedal with snap-fit bushing of claim 2, wherein the second pivot bushing includes opposed elastically deflectable first and second arms and the elastically deflectable first and second arms of the second pivot bushing deflect toward each other when the second pivot bushing enters the retention portion of the second slot.

4. The pedal with snap-fit bushing of claim 2, wherein the retention portion of each of the first slot created in the first wall and the second slot created in the second wall include a lower wall and an opposed upper wall, the lower wall including a first elongated opening and the upper wall including a second elongated opening.

5. The pedal with snap-fit bushing of claim 4, wherein as each of the first pivot bushing and the second pivot bushing approach an end of the retention portion, the elastically deflectable first arm elastically springs outwardly to be partially received within the first elongated opening created in the lower wall and the elastically deflectable second arm elastically springs outwardly to be partially received within the second elongated opening created in the upper wall.

6. The pedal with snap-fit bushing of claim 4, wherein the first deflection arm upon entering the first elongated opening contacts an edge defined by the first elongated opening and the second deflection arm upon entering the second elongated opening contacts an edge defined by the second elongated opening to releasably lock each of the first pivot bushing and the second pivot bushing within the retention portion.

7. The pedal with snap-fit bushing of claim 4, wherein a maximum spacing between the elastically deflectable first arm and the elastically deflectable second arm in as as-molded, non-deflected condition is greater than or equal to a gap between the lower wall and the upper wall of the retention portion.

8. The pedal with snap-fit bushing of claim 1, wherein the mounting pin includes a first shoulder at a first end and a second shoulder at a second end, having the first pivot bushing mounted to the first shoulder and the second pivot bushing mounted to the second shoulder.

9. The pedal with snap-fit bushing of claim 1, further including a tubular sleeve fixed to the pedal arm, the mounting pin rotatably received within an annular bore of the tubular sleeve and extending partially beyond opposed first and second ends of the tubular sleeve, wherein the first pivot bushing extends outward of the first end of the tubular sleeve and the second pivot bushing extends outward of the second end of the tubular sleeve.

10. The pedal with snap-fit bushing of claim 9, wherein the tubular sleeve is bisected by the pedal arm and is fixed by welding to the pedal arm.

11. A pedal with snap-fit bushing, comprising:
a pedal arm having a tubular sleeve oriented perpendicular to the pedal arm and fixed to the pedal arm;
a mounting pin rotatably received within an annular bore of the tubular sleeve and extending partially beyond opposed ends of the tubular sleeve;
a first pivot bushing rotatably mounted to a first end of the mounting pin extending outward of the tubular sleeve, the first pivot bushing having an elastically deflecting first arm;
a second pivot bushing rotatably mounted to a second end of the mounting pin extending outward of the tubular sleeve, the second pivot bushing having an elastically deflecting first arm; and
a pedal housing including a first wall having a first slot and a second wall having a second slot, the first pivot bushing received in a retention portion of the first slot and the second pivot bushing received in a retention portion of the second slot to releasably retain the mounting pin allowing rotation of the pedal arm and the tubular sleeve about a rotational axis of the mounting pin.

12. The pedal with snap-fit bushing of claim 11, wherein:
the first pivot bushing includes an elastically deflecting second arm opposed to the elastically deflecting first arm of the first pivot bushing; and
the second pivot bushing includes an elastically deflecting second arm opposed to the elastically deflecting first arm of the second pivot bushing.

13. The pedal with snap-fit bushing of claim 12, wherein:
the first slot and the second slot each include an entrance portion leading into the retention portion; and
the retention portion of each of the first slot created in the first wall and the second slot created in the second wall include a lower wall and an opposed upper wall, the lower wall including a first elongated opening and the upper wall including a second elongated opening.

14. The pedal with snap-fit bushing of claim 13, wherein a maximum spacing between the first arm and the second arm of each first pivot bushing and second pivot bushing in as as-molded, non-deflected condition is greater than or equal to a gap between the lower wall and the upper wall of the retention portion such that as the first pivot bushing enters the retention portion of the first slot the elastically deflectable first arm of the first pivot bushing and the elastically deflectable second arm of the first pivot bushing elastically deflect toward each other creating a stored elastic biasing force, and as the second pivot bushing enters the second slot, the elastically deflectable first arm of the second pivot bushing and the elastically deflectable second arm of the second pivot bushing elastically deflect toward each other creating a stored elastic biasing force.

15. The pedal with snap-fit bushing of claim 14, wherein each of the arms further includes a flat stop face, and wherein the arms extend due to the stored elastic biasing force into one of the first or the second elongated openings and the flat stop face seats against an edge of the elongated openings.

16. The pedal with snap-fit bushing of claim 14, wherein the mounting pin when received in the annular bore of the tubular sleeve, the first pivot bushing rotatably mounted to the first end of the mounting pin, and the second pivot bushing rotatably mounted to the second end of the mounting pin together define a pedal assembly, the pedal assembly installed in the pedal housing in an initial installation direction with the first pivot bushing being slidably received in the entrance portion of the first slot and the second pivot bushing being slidably received in the entrance portion of the second slot.

17. The pedal with snap-fit bushing of claim 16, wherein in a final installation direction of the pedal assembly different from the initial installation direction, the first pivot bushing is slidably displaced into the retention portion of the first slot and the second pivot bushing is slidably displaced into the retention portion of the second slot with the first arm of each of the first pivot bushing and the second pivot bushing sliding along the lower wall of each retention portion and the second arm of each of the first pivot bushing and the second pivot bushing sliding along each upper wall of the retention portion.

18. A pedal with snap-fit bushing, comprising:
a pedal assembly including:
a pedal arm having a tubular sleeve oriented perpendicular to the pedal arm and fixed to the pedal arm;
a mounting pin rotatably received within an annular bore of the tubular sleeve and extending partially beyond opposed ends of the tubular sleeve;
a first pivot bushing rotatably mounted to a first end of the mounting pin extending outward of the tubular sleeve, the first pivot bushing having an elastically deflecting first arm and an elastically deflecting second arm; and
a second pivot bushing rotatably mounted to a second end of the mounting pin extending outward of the tubular sleeve, the second pivot bushing having an elastically deflecting first arm and an elastically deflecting second arm; and
a pedal housing including a first wall having a first "L" shaped slot and a second wall having a second "L" shaped slot, the first pivot bushing received in an entrance portion of the first slot and having the first and second arms of the first pivot bushing releasably retained in a retention portion of the first slot, the second pivot bushing received in an entrance portion of the second slot and having the first and second arms of the second pivot bushing releasably retained in a retention portion of the second slot thereby preventing rotation of the first pivot bushing and the second pivot bushing while allowing rotation of the pedal arm and the tubular sleeve about a rotational axis of the mounting pin.

19. The assembly having a pedal with snap-fit bushing of claim 18, wherein during assembly of the pedal assembly into the pedal housing:

the first pivot bushing is received in the entrance portion of the first slot in a first direction and is moved into the retention portion in a second direction different than the first direction; and the second pivot bushing is received in the entrance portion of the second slot in the first direction and is moved into the retention portion in the second direction.

20. The assembly having a pedal with snap-fit bushing of claim 19, wherein during installation of the pedal assembly into the pedal housing the first arm of each of the first and second pivot bushings enters a respective first elongated opening created in the retention portion of the pedal housing and contacts an edge defined by the first elongated opening, and the second arm of each of the first and second pivot bushings enters a respective second elongated opening created in the retention portion of the pedal housing and contacts an edge defined by the second elongated opening to releasably lock each of the first pivot bushing and the second pivot bushing within the retention portion.

\* \* \* \* \*